March 31, 1953 — L. G. DRURY — 2,632,963
DEVICE FOR TEACHING VERNIER READING
Filed Aug. 29, 1950
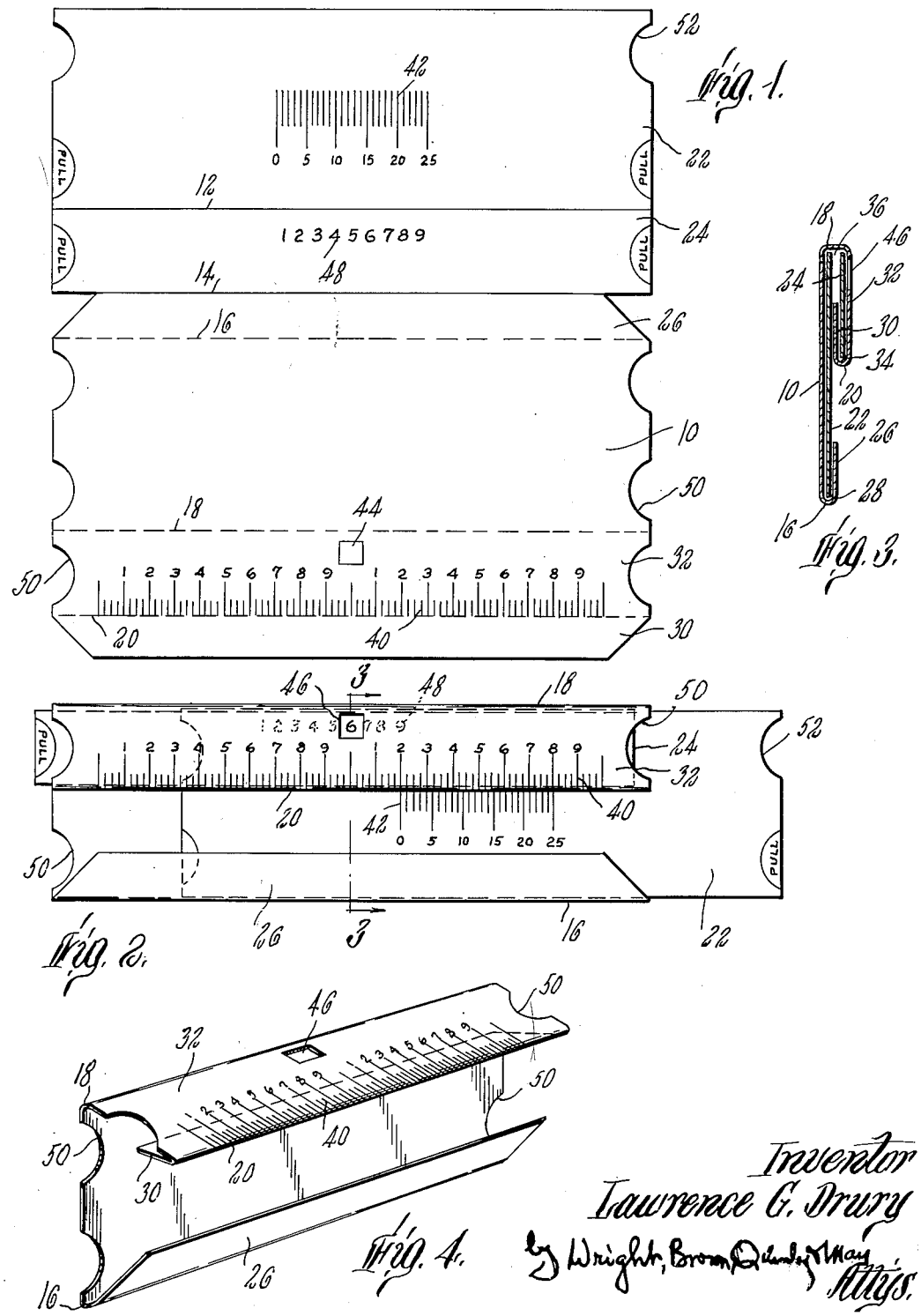
Inventor
Lawrence G. Drury
by Wright, Brown, Quinby & May
Attys.

Patented Mar. 31, 1953

2,632,963

UNITED STATES PATENT OFFICE 2,632,963

DEVICE FOR TEACHING VERNIER READING

Lawrence G. Drury, Newton, Mass.

Application August 29, 1950, Serial No. 182,013

2 Claims. (Cl. 35—39)

This invention relates to an educational device for teaching the reading of vernier scales. It is an object of the invention to provide a device of this kind which can be supplied in partly prepared form to be completed by the user. It is a further object of the invention to provide a device which can be cheaply made and on which the scales can be easily inspected by an instructor.

The invention may be embodied in a device made of moderately stiff paper, plastic or other sheet material which can be folded and which will retain its shape. Suitable lines of fold are indicated on the sheet and also lines along which the sheet may be cut to provide two sliding strips. Scale divisions are also provided on the sheet in such a way that when the parts are cut out, folded and assembled, a typical vernier scale will be available.

For a more complete understanding of the invention, reference may be had to the following description of an embodiment thereof and to the drawing, of which—

Figure 1 is a plan view of a partly formed device in convenient condition for shipment or sale;

Figure 2 is a front view of a completed device embodying the invention;

Figure 3 is a section on the line 3—3 of Figure 2; and

Figure 4 is a perspective view of one of the members of the invention showing the folds.

Figure 1 illustrates a partly made device consisting of a generally rectangular sheet 10, the outline contour of which has been cut from a larger sheet. This outline may, if preferred, be printed on such larger sheet for the purchaser to cut out. Within the contour as shown are a series of five transverse lines 12, 14, 16, 18, and 20, all of which are parallel to the ends of the sheet. The first line 12 defines a line of cut to sever a relatively wide strip 22 from the sheet. A second strip 24 may thereafter be severed by cutting along the second line 14, this strip being considerably narrower than the strip 22. When the two strips have been severed, the remainder of the sheet can be folded to form a sheath to receive the strips. The lines 16, 18, and 20 are lines of fold, the folding operations along such lines being adapted to produce a sheath in which the strips 22 and 24 are slidable. The lines 14 and 16 define a marginal flap 26 which is to be folded back against the opposite face of the sheet on the folding line 16 so as to form a narrow channel 28 to receive and guide an edge of the strip 22 as indicated in Figure 3. Between the folding line 20 and the adjacent end of the sheet is a flap 30 which is to be folded back against the opposite face of the sheet. A second fold is thereupon made on the line 18, the section 32 being folded back against the opposite face. Figure 1 shows the reverse face of the sheet 10, while Figure 2 shows the obverse face after the folds have been made. When the device is in its normal position as shown in Figure 2, the flap 26 extends upward from the line fo fold 16 forming the guide channel 28. The flap 30, as indicated in Figure 3, extends upward under the section 32 forming an auxiliary guide channel 34. The section 32 extends downward from the line of fold 18 forming an inverted channel 36 at the upper edge of the device. The distance between the lines 16 and 18 is slightly greater than the width of the slide 22. Hence the slide when inserted in the channels 28 and 36 will be guided as it is moved to the right or left. The distance between the lines of fold 18 and 20 is slightly greater than the width of the slide 24 so that the slide can be inserted between the channels 34 and 36 so as to be guided thereby.

On the sheet 10 a series of scale marks 40 are provided, these scale marks being on the section 32 and intersecting the line of fold 20. To cooperate with these scale marks a series of vernier scale marks 42 are provided on the slide 22, these vernier scale marks being so arranged as to cooperate with the scale marks 40 when the device is properly assembled as illustrated in Figure 2. Within the area 32, a small rectangle 44 is indicated, this rectangle being intended to be cut out to provide a small window 46 (Figure 4) through which can be seen any one of a series of numerals 48 which are provided on the narrow strip 24.

The scales may be employed to illustrate any desired unit of length such as inches, the scale divisions, however, being preferably considerably larger than the designated unit in order to facilitate inspection of the correctness of the readings on the slides. For example, in the device as illustrated on the drawing the numerals 48 on the narrow strip are intended to represent whole inches, consequently when the device is to be adjusted to indicate a length of a certain number of inches, the narrow slide 24 is moved along until the digit corresponding to the whole number of inches appears in the window 44. In the scale 40, as shown, each group of scale divisions represents $\frac{1}{10}$ of an inch and each individual scale division thus represents .025 inch. The vernier scale 42 consists of 25 scale divisions having a total length equal to 24 divisions of the scale 40 as indicated in Figure 2. Hence the difference between the widths of a vernier scale division and a division of the scale 40 represents .001. In order to set the device to indicate a prescribed number of thousandths of an inch, the slide 22 is moved to the right or left until the zero of the vernier is to the right of the large numbered scale division of the scale 40. The proper vernier scale mark is aligned with one of the scale marks of the scale 40 in accordance with the digits in the second and third places to the right of the decimal point. In order to facilitate access to the slides within the sheath, arcuate cutouts 50 are provided in the ends of the sheath so that the ends of the slides may readily be grasped. The wider slide 22 may also be provided with arcuate cutouts 52 where the narrow slide overlies the wider slide so that ready access may be had to the ends of the narrow slide.

I claim:

1. An educational device comprising a rectangular piece of sheet material having its lower margin folded up against the front face thereof to form a lower guiding flange and the upper margin folded down against said front face to form an upper guiding flange, a broad strip slidably fitted between the folds against said front face, said upper flange having an aperture and a marginal flap folded under to form an auxiliary guiding flange, a narrow strip slidably fitted between the upper fold and auxiliary fold, numerals on said narrow strip adapted to register individually with said aperture, scale marks on said upper flange at said auxiliary fold, and verner scale marks on said broad strip located to cooperate with the scale marks on the upper flange.

2. An educational device comprising a rectangular sheet having its upper margin folded down twice against the front face of the sheet, the first-folded area forming a flap underlying a portion of the second-folded area, said second-folded area overlying a portion of the front face of the sheet and having an aperture therethrough and scale marks along its lower edge, said sheet also having its lower margin bent up against its front face, a narrow strip slidably fitted behind said second-folded area and between the lines of successive folding with numerals thereon adapted to appear successively through said aperture when the strip is moved longitudinally, and a broad strip slidably fitted on the front face of the sheet between the upper and lower folds and provided with vernier scale marks arranged to cooperate with said scale marks.

LAWRENCE G. DRURY.

REFERENCES CITED

The following references are of record in the file of this patent:

UNITED STATES PATENTS

| Number | Name | Date |
|---|---|---|
| 1,186,093 | Harvey | June 6, 1916 |
| 1,431,409 | Miller | Oct. 10, 1922 |
| 1,609,972 | Sherrer | Dec. 7, 1926 |
| 2,158,476 | Morse | May 16, 1939 |

OTHER REFERENCES

"The Amateur Photographer and Cinema Photographer (Supplement);" May 20, 1935; pages 464 and 464a.

"Catalogue Scientific Instruments," L. E. Knott Apparatus Co., Boston, Mass., page 31; received October 20, 1916.